(12) United States Patent
Tanaka

(10) Patent No.: US 8,344,311 B2
(45) Date of Patent: Jan. 1, 2013

(54) OPTICAL TOUCH PANEL

(75) Inventor: Toshio Tanaka, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 261 days.

(21) Appl. No.: 12/967,658

(22) Filed: Dec. 14, 2010

(65) Prior Publication Data

US 2011/0186718 A1 Aug. 4, 2011

(30) Foreign Application Priority Data

Jan. 29, 2010 (JP) .................. 2010-018936
Sep. 17, 2010 (JP) .................. 2010-209136

(51) Int. Cl.
*G06F 3/042* (2006.01)
(52) U.S. Cl. .............. 250/221; 345/173; 345/175
(58) Field of Classification Search ............ 250/221, 250/222.1, 216; 345/173, 175, 176, 178; 178/18.01, 18.09
See application file for complete search history.

(56) References Cited

U.S. PATENT DOCUMENTS

| | | | |
|---|---|---|---|
| 6,597,508 B2 | 7/2003 | Seino et al. | |
| 7,705,835 B2 * | 4/2010 | Eikman | 345/176 |
| 8,289,299 B2 * | 10/2012 | Newton | 345/175 |
| 2011/0157097 A1 * | 6/2011 | Hamada et al. | 345/175 |

FOREIGN PATENT DOCUMENTS

| | | |
|---|---|---|
| JP | 2000-311051 | 7/2000 |
| JP | 2003-040491 | 2/2003 |
| JP | 2003-122504 | 4/2003 |

* cited by examiner

*Primary Examiner* — Kevin Pyo
(74) *Attorney, Agent, or Firm* — David N. Lathrop

(57) ABSTRACT

An optical touch panel comprises a transparent plate, a plurality of light-emitting devices and a plurality of light-receiving devices arranged around the transparent plate, a first substrate to which some of the light-receiving devices are fixed, and a second substrate to which others of the light-receiving devices are fixed. Each of the substrates has a surface layer that has a surface roughness which causes diffuse reflection of the same kind of light as light emitted by the light-emitting devices. A region having the surface roughness on a surface of the surface layer includes a region on the surface of the surface layer included in directivity ranges of the light-receiving devices fixed to the substrate.

12 Claims, 15 Drawing Sheets

OPTICAL TOUCH PANEL

TECHNICAL FIELD

The present invention relates to an optical touch panel.

BACKGROUND ART

Recently, apparatuses having a liquid crystal display (LCD) or other display device and an optical touch panel (an infrared matrix touch panel) mounted on the front surface of the display device (referred to as an interactive machine hereinafter for the convenience of explanation), such as automated teller machines (ATMs) and ticket vending machines, installed in various places including outdoor areas have been increasing.

FIG. 1 is a plan view of a typical optical touch panel 90, FIG. 2 is a plan view of the optical touch panel 90 with an infrared-transparent bezel 107 and a light blocking cover 109 removed, and FIG. 3 is a cross-sectional view of the optical touch panel 90 taken along the line A1-A1 in FIG. 1. Referring to these drawings, the optical touch panel 90 will be described. Note that FIGS. 1 to 3 do not show the interactive machine provided with the optical touch panel 90. Note also that FIGS. 1 to 3 do not show a component that supports substrates 101x, 101y, 91x and 91y, a component to which the light blocking cover 109 is attached, and the like. In the following description, the substrate is referred to as a printed wiring board.

The optical touch panel 90 comprises a rectangular transparent plate (referred to as a transparent plate hereinafter) 105, the infrared-transparent bezel 107 having a property of transmitting infrared light, the light blocking cover 109 that blocks ambient light 21, a plurality of light-emitting devices 103x, a plurality of light-emitting devices 103y, a plurality of light-receiving devices 130x, the number of light-receiving devices 130x being equal to the number of light-emitting devices 103x, a plurality of light-receiving devices 130y, the number of light-receiving devices 130y being equal to the number of light-emitting devices 103y, the two printed wiring boards 101x and 101y, and the two printed wiring boards 91x and 91y.

Specific examples of the light-emitting devices 103x and 103y include an infrared light-emitting diode (LED). Specific examples of the light-receiving devices 130x and 130y include an infrared phototransistor. The transparent plate 105 is made of a synthetic resin having high transparency (such as poly(methyl methacrylate)) or hardened glass, for example. The infrared-transparent bezel 107 is made of a synthetic resin having infrared transparency (such as methacrylate resin), for example. The light blocking cover 109 is made of a synthetic resin having a light blocking effect, for example. Examples of the ambient light 21 include sunlight and light from an incandescent lamp including infrared light.

As shown in FIG. 2, the plurality of light-emitting devices 103x and 103y and the plurality of light-receiving devices 130x and 130y are arranged to surround the transparent plate 105.

More specifically, the plurality of light-emitting devices 103x are arranged in a row along one of a pair of opposite sides of the transparent plate 105 with the light-emitting surface of each light-emitting device 103x facing to the transparent plate 105. The plurality of light-receiving devices 130x are arranged in a row along the other of the pair of opposite sides of the transparent plate 105 with the light-receiving surface of each light-receiving device 130x facing to the transparent plate 105. In the following description, an axis along which the pair of opposite sides extends is referred to as a Y axis.

Similarly, the plurality of light-emitting devices 103y are arranged in a row along one of the other pair of opposite sides of the transparent plate 105 with the light-emitting surface of each light-emitting device 103y facing to the transparent plate 105. The plurality of light-receiving devices 130y are arranged in a row along the other of the other pair of opposite sides of the transparent plate 105 with the light-receiving surface of each light-receiving device 130y facing to the transparent plate 105. In the following description, an axis along which the other pair of opposite sides extends is referred to as an X axis.

In a configuration in which all the light-emitting devices 103x and 103y and all the light-receiving devices 130x and 130y are arranged around the transparent plate 105, the light-emitting surface of each light-emitting device 103x is opposite to the light-receiving surface of the associated light-receiving device 130x, and the light-emitting surface of each light-emitting device 103y is opposite to the light-receiving surface of the associated light-receiving device 130y. Therefore, in the optical touch panel 90, as shown in FIG. 2, each pair of one light-emitting device 103x and one light-receiving device 130x disposed opposite to each other forms a light path 23x parallel to the X axis, and each pair of one light-emitting device 103y and one light-receiving device 130y disposed opposite to each other forms a light path 23y parallel to the Y axis.

Each light-emitting device 103x has narrow directivity so that the light-emitting device 103x is not optically coupled with the other light-receiving devices than the light-receiving device 130x associated therewith. Similarly, each light-emitting device 103y has narrow directivity so that the light-emitting device 103y is not optically coupled with the other light-receiving devices than the light-receiving device 130y associated therewith.

Assuming that the number of pairs of one light-emitting device 103x and one light-receiving device 130x associated therewith is M, M light paths 23x parallel to the X axis are formed. Assuming that the number of pairs of one light-emitting device 103y and one light-receiving device 130y associated therewith is N, N light paths 23y parallel to the Y axis are formed. Since each light path 23x and each light path 23y in the optical touch panel 90 are perpendicular to each other, the light paths 23x and 23y form a mesh (referred to as an optical mesh hereinafter) when viewed from the front of the transparent plate 105 (see FIG. 2).

In practice, the light-emitting devices 103x are fixed to the printed wiring board 101x, and the light-emitting devices 103y are fixed to the printed wiring board 101y. Similarly, the light-receiving devices 130x are fixed to the printed wiring board 91x, and the light-receiving devices 130y are fixed to the printed wiring board 91y. Typically, a multilayer structure of wiring to drive and control the light-emitting devices 103x is formed on the printed wiring board 101x, a multilayer structure of wiring to drive and control the light-emitting devices 103y is formed on the printed wiring board 101y, a multilayer structure of wiring to drive and control the light-receiving devices 130x is formed on the printed wiring board 91x, and a multilayer structure of wiring to drive and control the light-receiving devices 130y is formed on the printed wiring board 91y. Note that illustration of a control unit, a power supply and the like connected to the printed wiring boards 101x, 101y, 91x and 91y is omitted.

The printed wiring boards 101x, 101y, 91x and 91y are positioned around the transparent plate 105 in such a manner that the light paths 23x and 23y are generally several millimeters apart from one surface (referred to as a touchable plane hereinafter) 105a of the transparent plate 105. The surface of the transparent plate 105 opposite to the touchable plane 105a faces an LCD 25.

As shown in FIGS. 1 and 3, the infrared-transparent bezel 107 has the outer shape of a generally flat rectangular frame. An inner peripheral part 107a of the infrared-transparent bezel 107 has the shape of a flange inclined toward the center of the infrared-transparent bezel 107. The infrared-transparent bezel 107 is fixed to the transparent plate 105 with the inner peripheral edge face of the infrared-transparent bezel 107 being in contact with the periphery of the touchable plane 105a of the transparent plate 105. Thus, the optical touch panel 90 is configured so that the infrared-transparent bezel 107 covers the printed wiring boards 101x, 101y, 91x and 91y like a roof and the inner peripheral part 107a is positioned to interfere with the light paths 23x and 23y. Even with such a configuration, however, the inner peripheral part 107a does not optically block the light paths 23x and 23y because the infrared-transparent bezel 107 has a property of transmitting infrared light.

Since the infrared-transparent bezel 107 has a property of transmitting infrared light, if a light-receiving device 130x or 130y receives infrared light from a source other than the associated light-emitting device 103x or 103y, the optical touch panel 90 malfunctions. To avoid this, in the optical touch panel 90, the light blocking cover 109 shaped not to interfere with formation of the optical mesh and having a size enough to provide a light blocking function is fixed to the back surface of the infrared-transparent bezel 107 to shield the light-receiving devices 130x and 130y from unwanted light (see FIGS. 1 and 3). More specifically, the light blocking cover 109 is shaped and sized not to shield an inner peripheral edge part 107c (a part of the inner peripheral part 107a close to the inner peripheral edge face) and a part that is not exposed to the ambient light 21 but to shield the light-receiving devices 130x and 130y from unwanted light. Since infrared light along the light paths 23x and 23y transmits through the inner peripheral edge part 107c of the infrared-transparent bezel 107, the light blocking cover 109 has no effect on the optical mesh. Note that, in this example, the light blocking cover 109 also shields the light-emitting devices 103x and 103y from unwanted light in such a manner that the light blocking cover 109 does not affect the light paths 23x and 23y. Although FIG. 3 shows the cross section of the optical touch panel 90 taken in the X-axis direction, the cross section of the optical touch panel 90 shown in FIG. 3 can be regarded as the cross section of the optical touch panel 90 taken in the Y-axis direction by replacing the character "x" included in the reference symbols in FIG. 3 with "y" (for this reason, illustration of the cross section of the optical touch panel 90 taken in the Y-axis direction is omitted). Thus, note that the technical descriptions concerning the X-axis direction hold true for the Y-axis direction of the optical touch panel 90.

In the optical touch panel 90, the printed wiring boards 101x, 101y, 91x and 91y are fixed to a supporting component (not shown) in such a manner that the light-emitting devices 103x and 103y and the light-receiving devices 130x and 130y are positioned between the light blocking cover 109 and the printed wiring boards 101x, 101y, 91x and 91y.

When an obstacle having a certain size, such as a finger of a user and an instrument for manipulation, comes into contact with the touchable plane 105a in the optical touch panel 90 described above, the obstacle typically blocks at least one light path 23x extending in the X-axis direction and at least one light path 23y extending in the Y-axis direction. The two-dimensional position of the obstacle on the transparent plate 105 can be determined by detecting the blocked light paths in the X-axis and Y-axis directions. The information on the two-dimensional position is typically transmitted to the interactive machine.

In the optical touch panel 90, each light path 23x extending in the X-axis direction and each light path 23y extending in the Y-axis direction are perpendicular to each other. However, other than the optical touch panel thus configured, there is an optical touch panel that includes a plurality of light paths that are not perpendicular to each other, such as those disclosed in Japanese Patent Application Laid-Open No. 2003-122504 (referred to as a patent literature 2 hereinafter) and Japanese Patent Application Laid-Open No. 2000-311051 (referred to as a patent literature 3 hereinafter).

As described above, the typical optical touch panel includes at least a transparent plate and a plurality of light-emitting devices and a plurality of light-receiving devices disposed to surround the transparent plate, and a plurality of light paths used to determine the two-dimensional position of the obstacle on the transparent plate, each of which is formed by a pair of a light-emitting device and a light-receiving device, are formed in front of (or above) the transparent plate in such a manner that the light paths form a mesh when viewed from the front of the transparent plate.

Although the typical optical touch panel has the light blocking cover, the ambient light 21 may directly or indirectly reach a light-receiving device 130x or 130y to cause malfunction of the optical touch panel depending on the place where the interactive machine is installed. That is, even when a light path is blocked by an obstacle, the light path may be falsely recognized as not being blocked because of the ambient light 21 reaching the light-receiving device 130x or 130y. In this case, the two-dimensional position of the obstacle on the transparent plate 105 cannot be correctly detected.

An exemplary art to overcome the problem of the optical touch panel is disclosed in Japanese Patent Application Laid-Open No. 2003-040491 (referred to as a patent literature 1 hereinafter). The patent literature 1 discloses an art of reducing the ambient light reaching the light-receiving devices by forming a black serigraph layer on a resist layer of a substrate on which the light-receiving devices are mounted. However, the serigraph layer has a glossy surface, and it is difficult to adequately prevent the reflection of the ambient light from the glossy surface from reaching the light-receiving devices.

SUMMARY OF THE INVENTION

In view of such circumstances, an object of the present invention is to provide an optical touch panel that can be adequately prevented from malfunctioning because of ambient light.

An optical touch panel comprises: a transparent plate; a plurality of light-emitting devices and a plurality of light-receiving devices arranged in the vicinity of the transparent plate; a substrate to which at least one of the plurality of light-receiving devices is fixed, wherein a plurality of light paths are formed in front of the transparent plate, each light path being formed by a pair of one of the plurality of light-emitting devices and a corresponding one of the plurality of light-receiving devices, the substrate has a surface layer that has a surface roughness which causes diffuse reflection of the same kind of light as light emitted by each of the plurality of light-emitting devices, and a region having the surface roughness on a surface of the surface layer includes at least a region on the surface of the surface layer included in a directivity range of said at least one of the plurality of light-receiving devices fixed to the substrate.

EFFECTS OF THE INVENTION

For the optical touch panel according to the present invention, ambient light is reflected diffusely by a substrate surface and thereby prevented from reaching a light-receiving device. As a result, the possibility of malfunction of the optical touch panel caused by the ambient light can be sufficiently reduced.

DETAILED DESCRIPTION OF THE EMBODIMENTS

Figure 1:
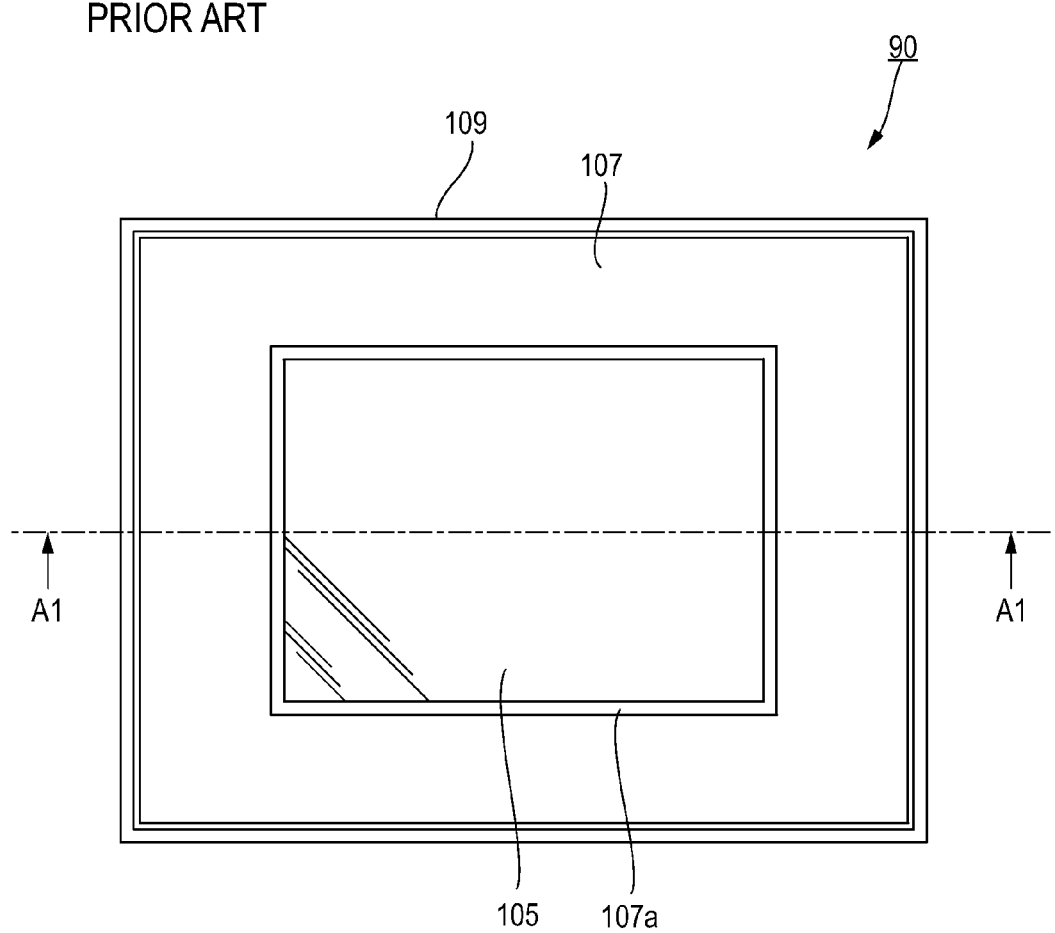
FIG. 1 is a plan view of a conventional optical touch panel 90.

The present invention will be summarized before detailed description of embodiments of the present invention.

For the optical touch panel 90 described earlier, when the angle of the ambient light 21 with respect to the touchable plane 105$a$ (referred to as an incident angle hereinafter) falls within a range of 5 to 30°, the ambient light 21 can reach a light-receiving device 130$x$ or 130$y$. Since the ambient light 21 incident at an angle of 5 to 30° does not directly reach any light-receiving device 130$x$ or 130$y$ in the optical touch panel 90 provided with the light blocking cover 109, it is considered that the ambient light 21 is reflected by a component around the light-receiving device 130$x$ or 130$y$ before reaching the light-receiving device 130$x$ or 130$y$. Therefore, the inventor investigated reflection paths through which the ambient light 21 reaches the light-receiving devices 130$x$ or 130$y$. In the following, the result of the investigation will be described.

In the optical touch panel 90 configured as described above, components that can reflect the ambient light 21 primarily include the transparent plate 105, the light blocking cover 109, and the printed wiring boards 91$x$ and 91$y$. It is generally confirmed that, depending on the dimensions and position of each component, the ambient light 21 reaches the light-receiving device 130$x$ or 130$y$ through any of the paths shown in Table 1. In Table 1, a circle mark ○ represents that the ambient light 21 reaches the light-receiving device 130$x$ or 130$y$ by reflection, and a cross mark x represents that the ambient light 21 does not reach the light-receiving device 130$x$ or 130$y$. FIGS. 4A to 4E show reflection paths of the ambient light 21 (illustration of a case of an incident angle of 25° is omitted). In FIGS. 4A to 4E, for the sake of simplicity, the cross sections of the components are not hatched. Although these drawings show only the cases for the printed wiring board 91$x$, the reflection paths of the ambient light 21 for the printed wiring board 91$y$ are the same as those for the printed wiring board 91$x$.

TABLE 1

| | reflection path | | | |
|---|---|---|---|---|
| | transparent plate 105 | printed wiring board 91x and 91y | transparent plate 105 ↓ light blocking cover 109 | transparent plate 105 ↓ light blocking cover 109 ↓ printed wiring board 91x and 91y |
| incident angle: 5° | ○ | ○ | X | X |
| incident | X | ○ | X | X |

TABLE 1-continued

| | | reflection path | | |
|---|---|---|---|---|
| | | | transparent plate 105 ↓ light blocking cover 109 | |
| | | transparent plate 105 ↓ light blocking cover 109 | | |
| | printed wiring board 91x and 91y | | | printed wiring board 91x and 91y |
| transparent plate 105 | | | | |
| incident angle: 10° | X | O | X | X |
| incident angle: 15° | X | X | O | X |
| incident angle: 20° | X | X | X | X |
| incident angle: 25° | X | X | X | O |
| incident angle: 30° | | | | |

As can be seen, the ambient light 21 is reflected by a component around the light-receiving device 130x or 130y to reach the light-receiving device 130x or 130y, thereby causing malfunction of the optical touch panel. In particular, as can be seen from Table 1 and FIGS. 4A to 4E, the ambient light 21 is most likely to be reflected by the printed wiring board 91x or 91y. Thus, reducing the reflectance of the surface of the printed wiring boards 91x and 91y can be most effective for preventing malfunction of the optical touch panel. For example, if the reflection from the surface of the printed wiring boards 91x and 91y can be prevented, the ambient light 21 incident at an angle of 5° can be prevented from reaching the light-receiving devices 130x and 130y, and the ambient light 21 incident at angles of 10°, 15° and 30° can be prevented from reaching the light-receiving devices 130x and 130y.

Although the investigation result is the result for the optical touch panel 90, conclusions derived from the investigation result can also be applied to other typical optical touch panels, since the optical touch panel 90 has a typical structure of the optical touch panel. As for the reflection paths of the ambient light 21, the conclusions described above can also be applied to other typical optical touch panels, depending on the dimensions and position of each component of the optical touch panel. This is because the light-receiving devices are typically fixed to the printed wiring boards, the surfaces of the printed wiring boards are closest to and most likely to affect the light-receiving devices, and this fact holds true for other optical touch panels having different structures regardless of the dimensions and position of each component in the optical touch panel.

As described above, the present invention has been devised in order to reduce the reflectance of the surface of the printed wiring boards to which the light-receiving devices are fixed. In the following, an optical touch panel 100 according to an embodiment of the present invention will be described with reference to the drawings. Note that the same components of the optical touch panel 100 as those of the conventional optical touch panel 90 are denoted by the same reference numerals. Although a number of components of the optical touch panel 100 are common to those of the conventional optical touch panel 90, the optical touch panel 100 will be described as fully as possible as an embodiment of the present invention.

Refer to FIG. 1 for a plan view of the optical touch panel 100 according to this embodiment, because the plan view of the optical touch panel 100 is the same as that of the optical touch panel 90.

Figure 5:
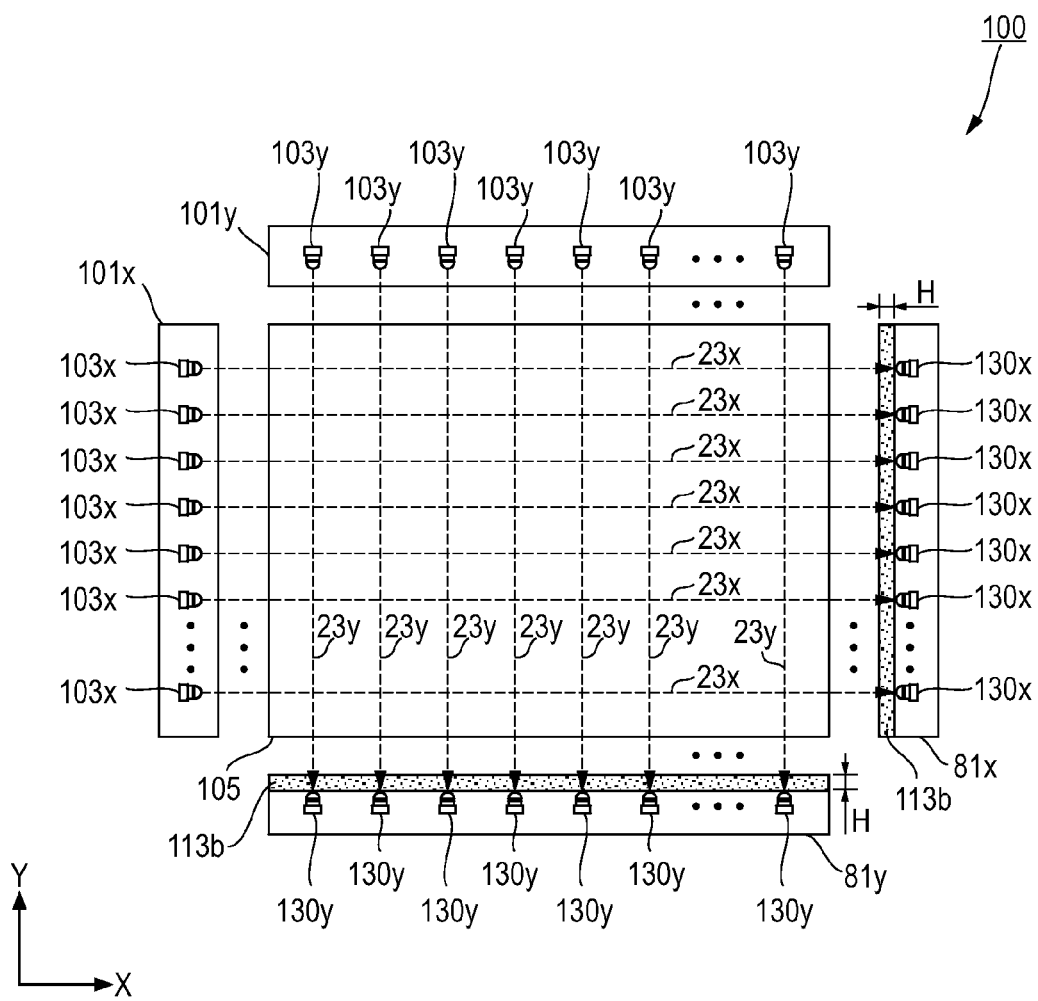
FIG. 5 is a plan view of an optical touch panel 100 with an infrared-transparent bezel 107 and a light blocking cover 109 removed.
Figure 6:
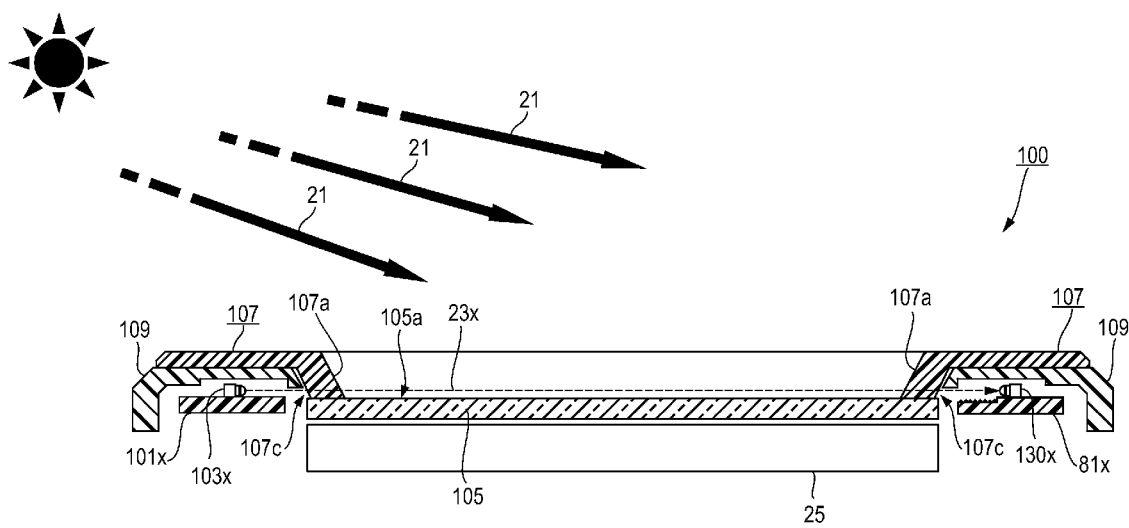
FIG. 6 is a cross-sectional view of the optical touch panel 100 taken along the line A1-A1.

FIG. 5 is a plan view of the optical touch panel 100 with an infrared-transparent bezel 107 and a light blocking cover 109 removed, and FIG. 6 is a cross-sectional view of the optical touch panel 100 taken along the line A1-A1 in FIG. 1. Note that FIGS. 5 and 6 do not show an interactive machine provided with the optical touch panel 100. Note also that FIGS. 5 and 6 do not show a component that supports printed wiring boards 101x and 101y and printed wiring boards 81x and 81y described later, a component to which the light blocking cover 109 is attached, and the like.

The optical touch panel 100 comprises a rectangular transparent plate (referred to as a transparent plate hereinafter) 105, the infrared-transparent bezel 107 having a property of transmitting infrared light, the light blocking cover 109 that blocks ambient light 21, a plurality of light-emitting devices 103x, a plurality of light-emitting devices 103y, a plurality of light-receiving devices 130x, the number of light-receiving devices 130x being equal to the number of light-emitting devices 103x, a plurality of light-receiving devices 130y, the number of light-receiving devices 130y being equal to the number of light-emitting devices 103y, the two printed wiring boards 101x and 101y, and the two printed wiring boards 81x and 81y. This embodiment is characterized by the two printed wiring boards 81x and 81y, which will be described in detail later.

Specific examples of the light-emitting devices 103x and 103y include an infrared LED. Specific examples of the light-receiving devices 130x and 130y include an infrared phototransistor. The transparent plate 105 is made of a synthetic resin having high transparency (such as poly(methyl methacrylate)) or hardened glass, for example. The infrared-transparent bezel 107 is made of a synthetic resin having infrared transparency (such as methacrylate resin), for example. The light blocking cover 109 is made of a synthetic resin having a light blocking effect, for example. Examples of the ambient light 21 include sunlight and light from an incandescent lamp including infrared light.

As shown in FIG. 5, the plurality of light-emitting devices 103x and 103y and the plurality of light-receiving devices 130x and 130y are arranged to surround the transparent plate 105.

More specifically, the plurality of light-emitting devices 103x are arranged in a row along one of a pair of opposite sides of the transparent plate 105 with the light-emitting surface of each light-emitting device 103x facing to the transparent plate 105. The plurality of light-receiving devices 130x are arranged in a row along the other of the pair of opposite sides of the transparent plate 105 with the light-receiving surface of each light-receiving device 130x facing to the transparent plate 105. In the following description, an axis along which the pair of opposite sides extends is referred to as a Y axis.

Similarly, the plurality of light-emitting devices 103y are arranged in a row along one of the other pair of opposite sides of the transparent plate 105 with the light-emitting surface of each light-emitting device 103y facing to the transparent plate 105. The plurality of light-receiving devices 130y are arranged in a row along the other of the other pair of opposite sides of the transparent plate 105 with the light-receiving surface of each light-receiving device 130y facing to the transparent plate 105. In the following description, an axis along which the other pair of opposite sides extends is referred to as an X axis.

In a configuration in which all the light-emitting devices 103x and 103y and all the light-receiving devices 130x and 130y are arranged around the transparent plate 105, the light-emitting surface of each light-emitting device 103x is opposite to the light-receiving surface of the associated light-receiving device 130x, and the light-emitting surface of each light-emitting device 103y is opposite to the light-receiving surface of the associated light-receiving device 130y. Therefore, in the optical touch panel 100, as shown in FIG. 5, each pair of one light-emitting device 103x and one light-receiving device 130x disposed opposite to each other forms a light path 23x parallel to the X axis, and each pair of one light-emitting device 103y and one light-receiving device 130y disposed opposite to each other forms a light path 23y parallel to the Y axis.

Each light-emitting device 103x has narrow directivity so that the light-emitting device 103x is not optically coupled with the other light-receiving devices than the light-receiving device 130x associated therewith. Similarly, each light-emitting device 103y has narrow directivity so that the light-emitting device 103y is not optically coupled with the other light-receiving devices than the light-receiving device 130y associated therewith.

Assuming that the number of pairs of one light-emitting device 103x and one light-receiving device 130x associated therewith is M, M light paths 23x parallel to the X axis are formed. Assuming that the number of pairs of one light-emitting device 103y and one light-receiving device 130y associated therewith is N, N light paths 23y parallel to the Y axis are formed. Since each light path 23x and each light path 23y in the optical touch panel 100 are perpendicular to each other, the light paths 23x and 23y form a mesh (referred to as an optical mesh hereinafter) when viewed from the front of the transparent plate 105 (from above a touchable plane 105a described later) (see FIG. 5).

In practice, the light-emitting devices 103x are fixed to the printed wiring board 101x, and the light-emitting devices 103y are fixed to the printed wiring board 101y. Similarly, the light-receiving devices 130x are fixed to the printed wiring board 81x, and the light-receiving devices 130y are fixed to the printed wiring board 81y. Typically, a multilayer structure of wiring to drive and control the light-emitting devices 103x is formed on the printed wiring board 101x, a multilayer structure of wiring to drive and control the light-emitting devices 103y is formed on the printed wiring board 101y, a multilayer structure of wiring to drive and control the light-receiving devices 130x is formed on the printed wiring board 81x, and a multilayer structure of wiring to drive and control the light-receiving devices 130y is formed on the printed wiring board 81y. Note that illustration of a control unit, a power supply and the like connected to the printed wiring boards 101x, 101y, 81x and 81y is omitted.

The printed wiring boards 101x, 101y, 81x and 81y are positioned around the transparent plate 105 in such a manner that the light paths 23x and 23y are generally several millimeters apart from one surface (referred to as a touchable plane hereinafter) 105a of the transparent plate 105. The surface of the transparent plate 105 opposite to the touchable plane 105a faces an LCD 25.

As shown in FIGS. 1 and 6, the infrared-transparent bezel 107 has the outer shape of a generally flat rectangular frame. An inner peripheral part 107a of the infrared-transparent bezel 107 has the shape of a flange inclined toward the center of the infrared-transparent bezel 107. The infrared-transparent bezel 107 is fixed to the transparent plate 105 with the inner peripheral edge face of the infrared-transparent bezel 107 being in contact with the periphery of the touchable plane 105a of the transparent plate 105. Thus, the optical touch panel 100 is configured so that the infrared-transparent bezel 107 covers the printed wiring boards 101x, 101y, 81x and 81y like a roof and the inner peripheral part 107a is positioned to interfere with the light paths 23x and 23y. Even with such a configuration, however, the inner peripheral part 107a does not optically block the light paths 23x and 23y because the infrared-transparent bezel 107 has a property of transmitting infrared light.

Since the infrared-transparent bezel 107 has a property of transmitting infrared light, if a light-receiving device 130x or 130y receives infrared light from a source other than the associated light-emitting device 103x or 103y, the optical touch panel 100 malfunctions. To avoid this, in the optical touch panel 100, the light blocking cover 109 shaped not to interfere with formation of the optical mesh and having a size enough to provide a light blocking function is fixed to the back surface of the infrared-transparent bezel 107 to shield the light-receiving devices 130x and 130y from unwanted light (see FIGS. 1 and 6). More specifically, the light blocking cover 109 is shaped and sized not to shield an inner peripheral edge part 107c (a part of the inner peripheral part 107a close to the inner peripheral edge face) and a part that is not exposed to the ambient light 21 but to shield the light-receiving devices 130x and 130y from unwanted light. Since infrared light along the light paths 23x and 23y transmits through the inner peripheral edge part 107c of the infrared-transparent bezel 107, the light blocking cover 109 has no effect on the optical mesh. Note that, in this example, the light blocking cover 109 also shields the light-emitting devices 103x and 103y from unwanted light in such a manner that the light blocking cover 109 does not affect the light paths 23x and 23y. Although FIG. 6 shows the cross section of the optical touch panel 100 taken in the X-axis direction, the cross section of the optical touch panel 100 shown in FIG. 6 can be regarded as the cross section of the optical touch panel 100 taken in the Y-axis direction by replacing the character "x" included in the reference symbols in FIG. 6 with "y" (for this reason, illustration of the cross section of the optical touch panel 100 taken in the Y-axis direction is omitted). Thus, note that the technical descriptions concerning the X-axis direction hold true for the Y-axis direction of the optical touch panel 100.

In the optical touch panel 100, the printed wiring boards 101x, 101y, 81x and 81y are fixed to a supporting component (not shown) in such a manner that the light-emitting devices 103x and 103y and the light-receiving devices 130x and 130y are positioned between the light blocking cover 109 and the printed wiring boards 101x, 101y, 81x and 81y.

When an obstacle having a certain size, such as a finger of a user and an instrument for manipulation, comes into contact with the touchable plane 105a in the optical touch panel 100 described above, the obstacle typically blocks at least one light path 23x extending in the X-axis direction and at least one light path 23y extending in the Y-axis direction. The two-dimensional position of the obstacle on the transparent plate 105 can be determined by detecting the blocked light paths in the X-axis and Y-axis directions. The information on the two-dimensional position is typically transmitted to the interactive machine.

In the optical touch panel 100, each light path 23x extending in the X-axis direction and each light path 23y extending in the Y-axis direction are perpendicular to each other. However, the present invention is not limited to such a configuration. For example, as disclosed in the patent literatures 2 and 3 described earlier, which are both fully and completely incorporated herein by reference, the optical touch panel can include a plurality of light paths that are not perpendicular to each other. In general, the optical touch panel includes at least a transparent plate and a plurality of light-emitting devices and a plurality of light-receiving devices disposed to surround the transparent plate, and a plurality of light paths used to determine the two-dimensional position of the obstacle, each of which is formed by a pair of a light-emitting device and a light-receiving device, are formed in front of the transparent plate in such a manner that the light paths form a mesh when viewed from the front of the transparent plate (from the front of the touchable plane 105a). Considering the typical position (or posture) of the optical touch panel during use, the phrase "from the front of the transparent plate" can be replaced with the phrase "from above the transparent plate".

In the following, differences between the printed wiring boards 81x and 81y of the optical touch panel 100 according to this embodiment and the printed wiring boards 91x and 91y of the conventional optical touch panel 90 will be described with reference to the drawings. In the example described below, it is assumed that the printed wiring boards 81x and 81y and the printed wiring boards 91x and 91y have a four-layer structure (see FIGS. 7 to 10).

[Conventional Printed Wiring Boards 91x and 91y]

Figure 7:
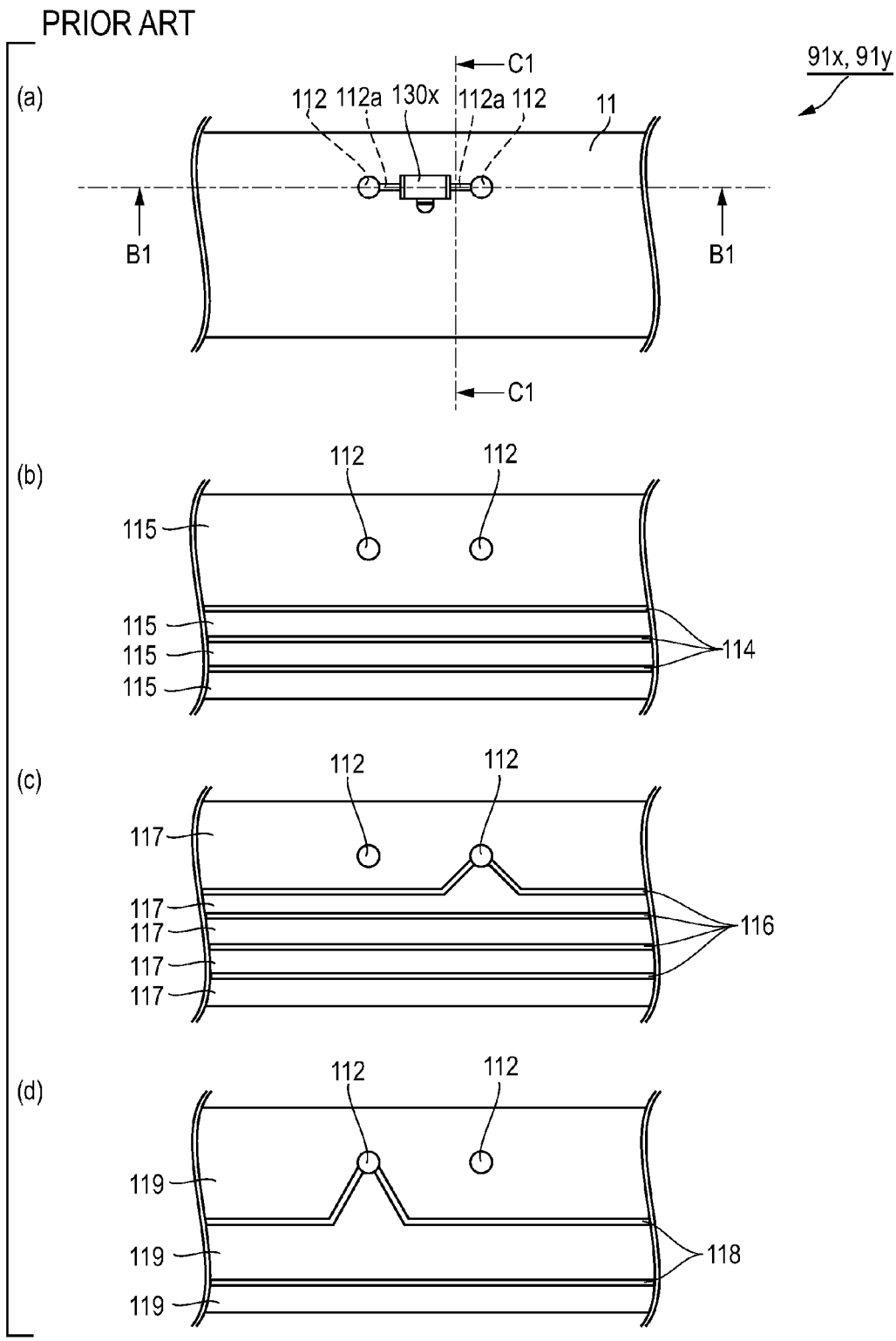
FIG. 7 includes diagrams showing a conventional printed wiring board 91$x$, in which FIG. 7($a$) shows a first layer of the conventional printed wiring board 91$x$, FIG. 7($b$) show a second layer of the same, FIG. 7($c$) shows a third layer of the same, and FIG. 7($d$) shows a fourth layer of the same.
Figure 9A:
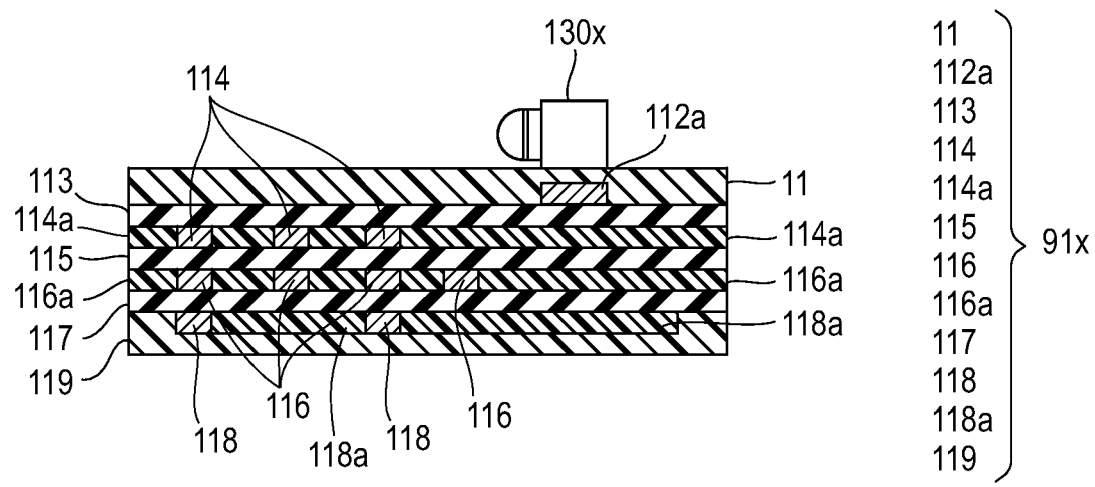
FIG. 9A is a cross-sectional view of the conventional printed wiring board 91$x$ taken along the line C1-C1 in FIG. 7.

First, the conventional printed wiring boards 91x and 91y will be described with reference to FIGS. 7 and 9A. The printed wiring boards 91x and 91y have the same structure, and therefore, only the printed wiring board 91x will be described below.

The printed wiring board 91x comprises a first resist layer 11, a first-layer pattern 112a, through-holes 112, a first insulating layer 113, a second-layer pattern 114, a second-layer insulating material 114a, a second insulating layer 115, a third-layer pattern 116, a third-layer insulating material 116a, a third insulating layer 117, a fourth-layer pattern 118, a fourth-layer insulating material 118a, and a second resist layer 119. In the following, the surface of the printed wiring board 91x on which the light-receiving devices 130x are mounted will be described as the upper surface, and the surface of the second resist layer 119 of the printed wiring board 91x will be described as the lower surface. However, these descriptions are not intended to limit the orientation of the printed wiring board 91x during use.

From the view points of electrical conductivity and cost, the first-layer pattern 112a, the second-layer pattern 114, the third-layer pattern 116 and the fourth-layer pattern 118 are made of copper, for example. The first resist layer 11 and the second resist layer 119 are made of thermosetting epoxy resin, for example. The first insulating layer 113, the second insulating layer 115 and the third insulating layer 117 are made of glass epoxy resin, for example. The glass epoxy resin (referred to also as glass cloth epoxy resin) is a stack of glass fiber cloth which is impregnated with epoxy resin and thereafter hardened by heat. Thus, the glass epoxy resin has a rough surface. The thickness of each layer and the shape of each pattern can be appropriately designed.

The fourth-layer pattern 118 is formed on the second resist layer 119, and the third insulating layer 117 is formed on the fourth-layer pattern 118. The spaces defined by the fourth-layer pattern 118 between the second resist layer 119 and the third insulating layer 117 are filled with the fourth-layer insulating material (an adhesive) 118a.

The third-layer pattern 116 is formed on the third insulating layer 117, and the second insulating layer 115 is formed on the third-layer pattern 116. The spaces defined by the third-layer pattern 116 between the third insulating layer 117 and the second insulating layer 115 are filled with the third-layer insulating material (an adhesive) 116a.

The second-layer pattern 114 is formed on the second insulating layer 115, and the first insulating layer 113 is formed on the second-layer pattern 114. The spaces defined by the second-layer pattern 114 between the second insulating layer 115 and the first insulating layer 113 are filled with the second-layer insulating material (an adhesive) 114a.

The first-layer pattern 112a is formed on the first insulating layer 113, and the through-holes 112 are formed in the first insulating layer 113, the second insulating layer 115 and the third insulating layer 117 to vertically penetrate through the layers. The first-layer pattern 112a, the second-layer pattern 114, the third-layer pattern 116 and the fourth-layer pattern 118 are in contact with at least one of the through-holes 112 in the respective layers as required and thereby electrically connected to each other.

Figure 2:
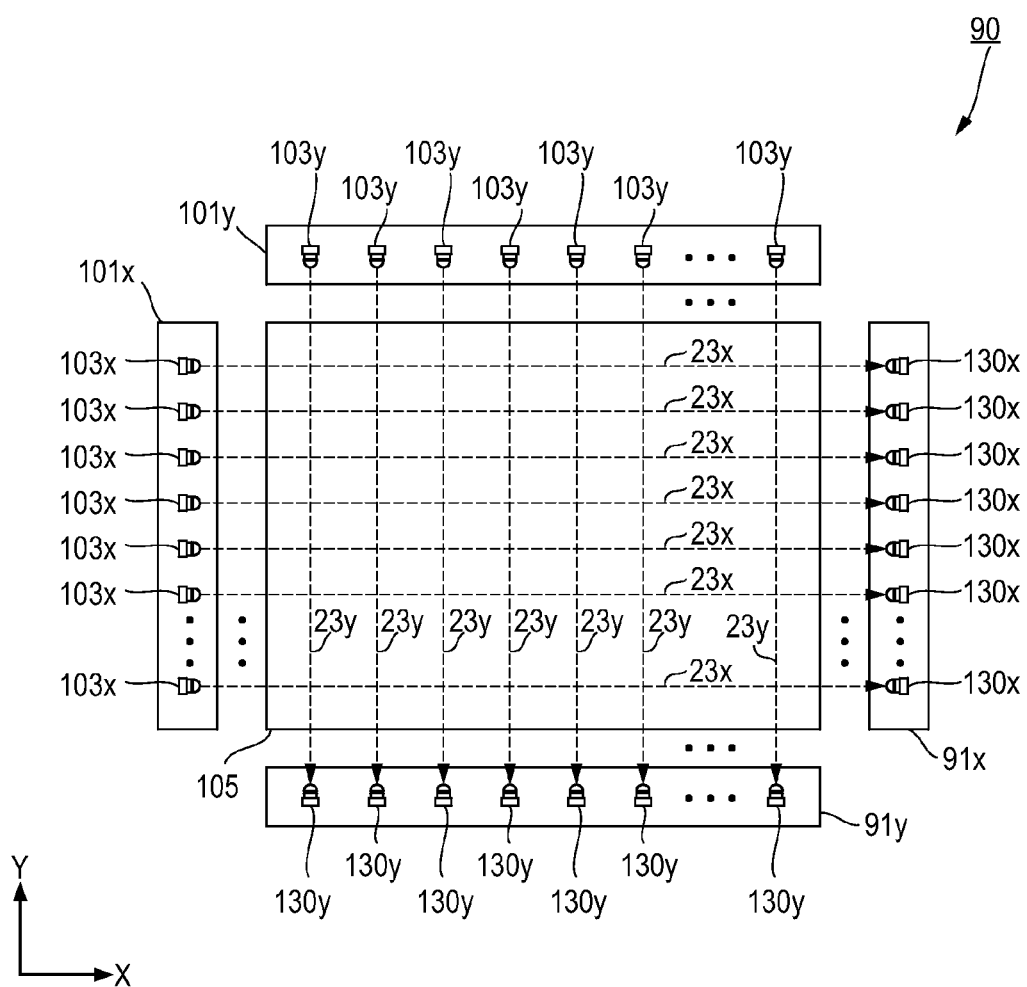
FIG. 2 is a plan view of the conventional optical touch panel 90 with an infrared-transparent bezel 107 and a light blocking cover 109 removed.
Figure 3:
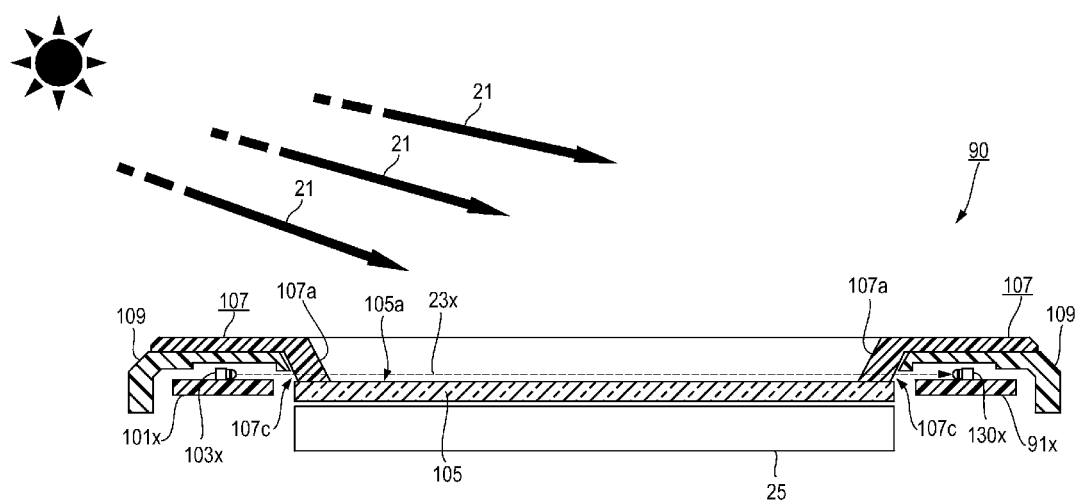
FIG. 3 is a cross-sectional view of the conventional optical touch panel 90 taken along the line A1-A1 in FIG. 1.
Figure 4A:
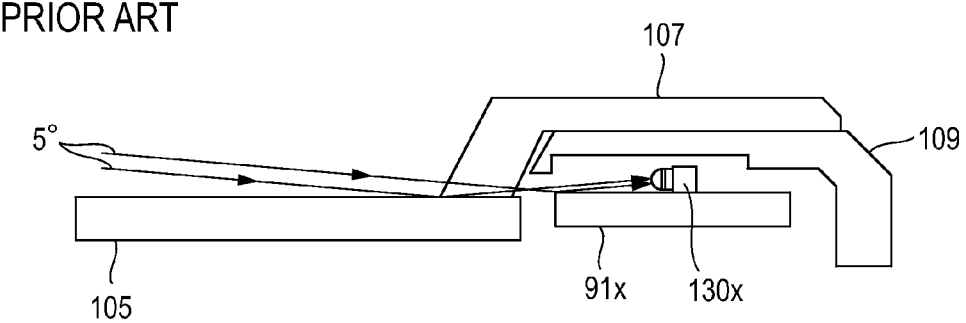
FIG. 4A is a diagram showing a reflection path of ambient light reaching a light-receiving device (in a case where the incident angle of the ambient light is 5°)
Figure 4B:
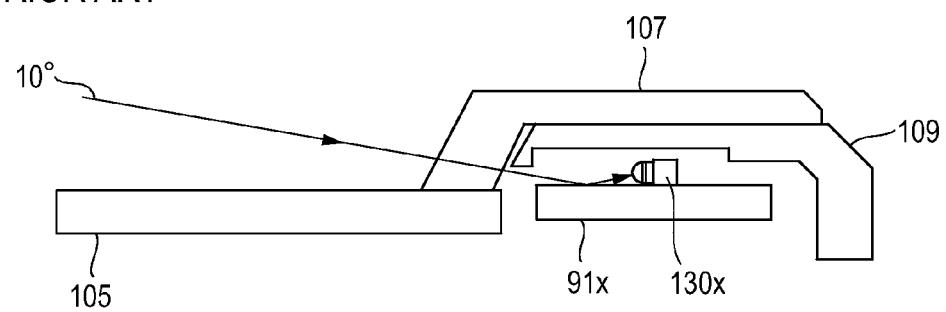
FIG. 4B is a diagram showing a reflection path of ambient light reaching a light-receiving device (in a case where the incident angle of the ambient light is 10°)
Figure 4C:
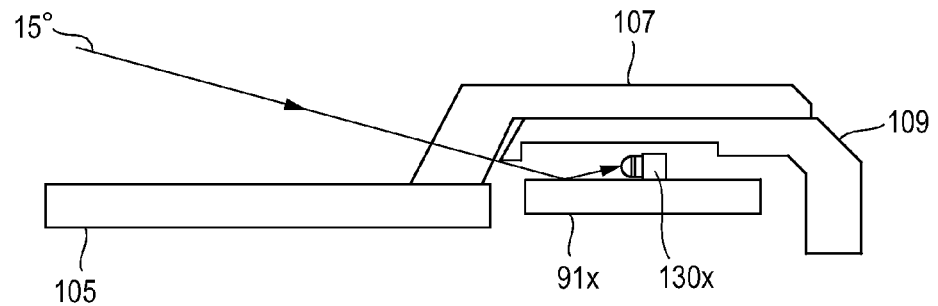
FIG. 4C is a diagram showing a reflection path of ambient light reaching a light-receiving device (in a case where the incident angle of the ambient light is 15°)
Figure 4D:
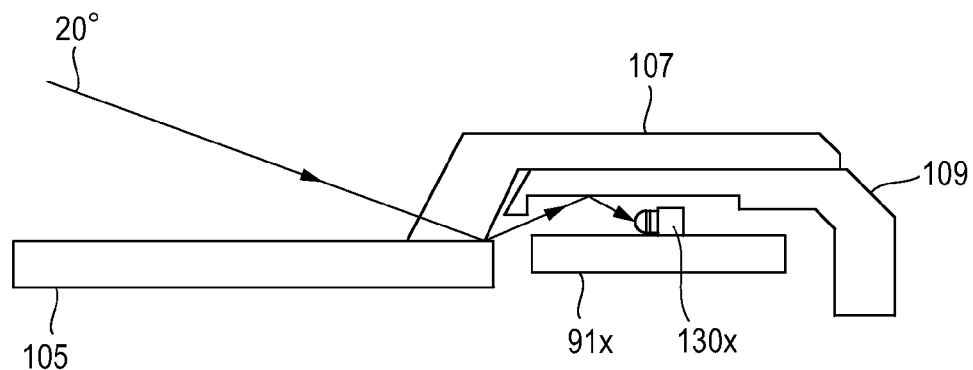
FIG. 4D is a diagram showing a reflection path of ambient light reaching a light-receiving device (in a case where the incident angle of the ambient light is 20°)
Figure 4E:
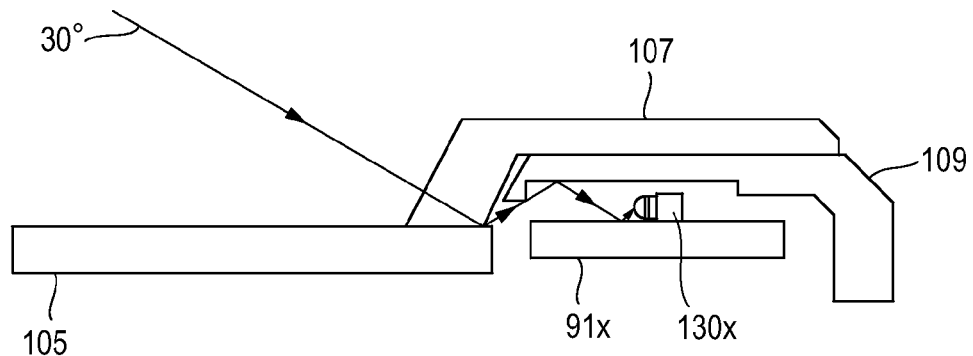
FIG. 4E is a diagram showing a reflection path of ambient light reaching a light-receiving device (in a case where the incident angle of the ambient light is 30°)

Except for a part of the first-layer pattern 112a, the first insulating layer 113, the first-layer pattern 112a and the through-holes 112 are covered with the first resist layer 11. More specifically, as shown in FIGS. 2 and 7(a), the entire upper surface of the printed wiring board 91x except for a part of the first-layer pattern 112a is covered with the first resist layer 11. Each lead 138 of the light-receiving device 130x is soldered to the exposed part of the first-layer pattern 112a (see FIG. 10). The cross section of the conventional printed wiring board 91x taken along the line B1-B1 in FIG. 7 is the same as the cross section of the printed wiring board 81x described later taken along the line B1-B1 in FIG. 8. Therefore, the cross section of the printed wiring board 81x shown in FIG. 10 can be regarded as the cross section of the conventional printed wiring board 91x by replacing a reference numeral 113b in FIG. 10 with a reference numeral 113.

[Printed Wiring Boards 81x and 81y According to this Embodiment]

Figure 8:
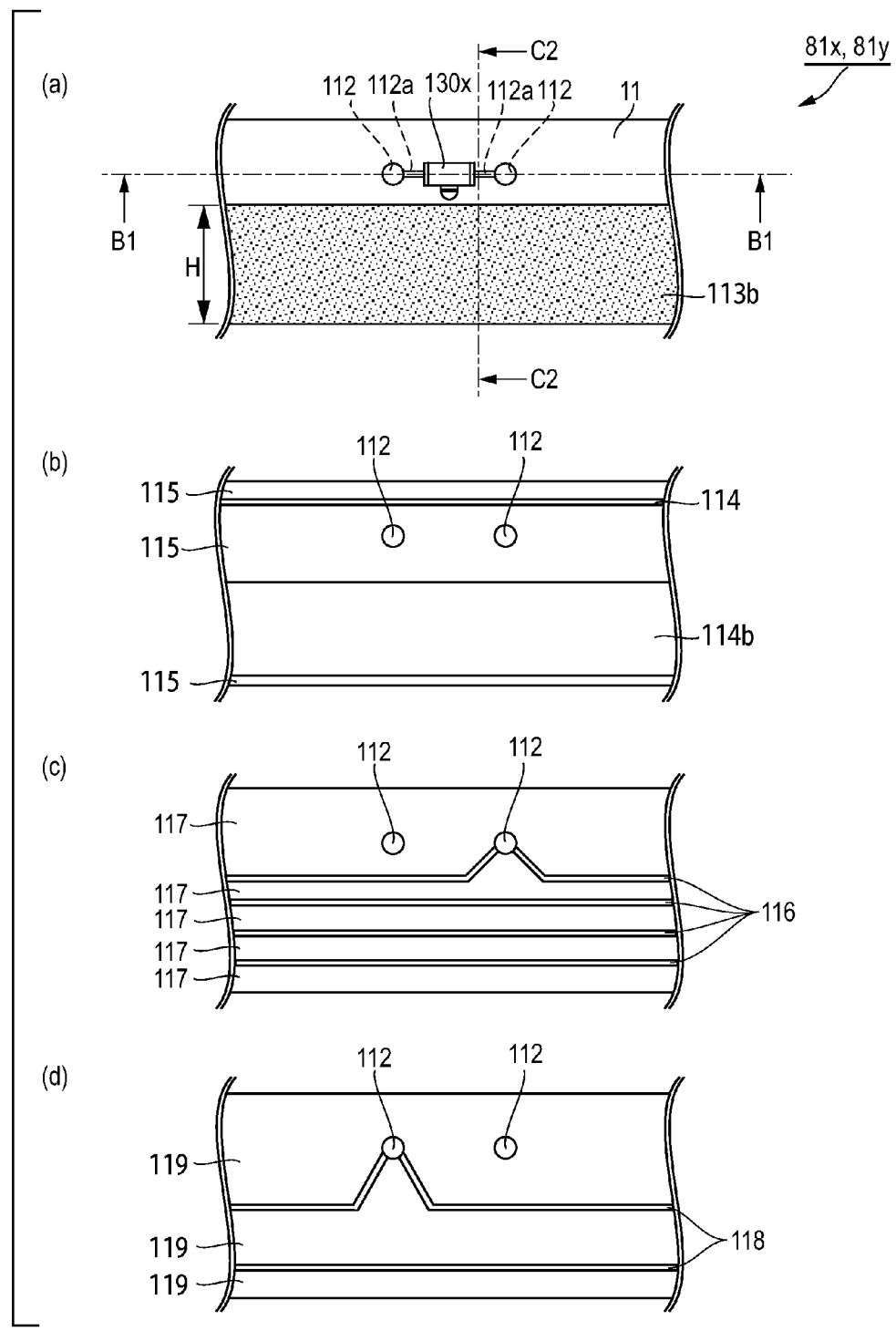
FIG. 8 includes diagrams showing a printed wiring board 81$x$, in which FIG. 8($a$) shows a first layer of the printed wiring board 81$x$, FIG. 8($b$) show a second layer of the same, FIG. 8($c$) shows a third layer of the same, and FIG. 8($d$) shows a fourth layer of the same.
Figure 9B:
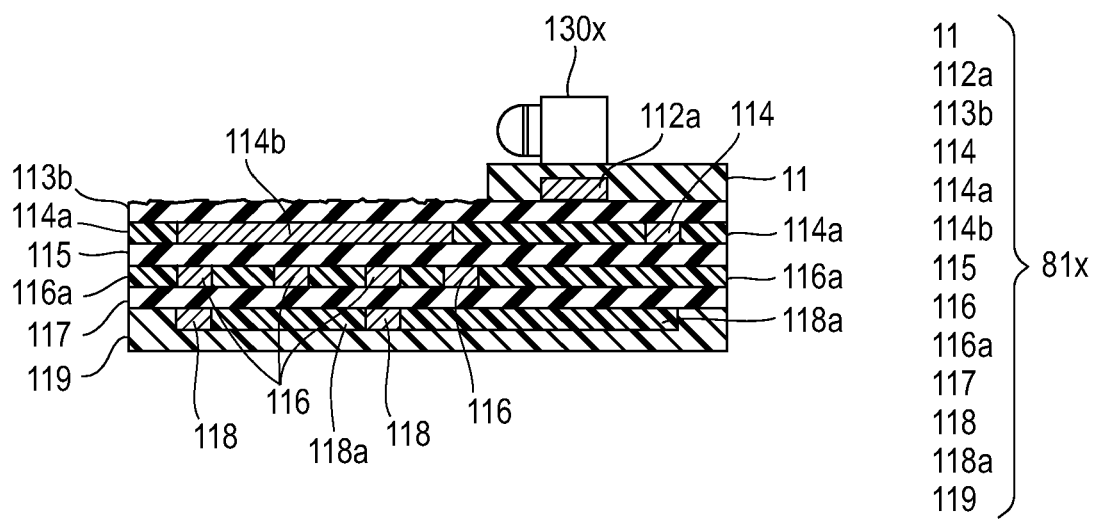
FIG. 9B is a cross-sectional view of the printed wiring board 81$x$ taken along the line C2-C2 in FIG. 8.
Figure 10:
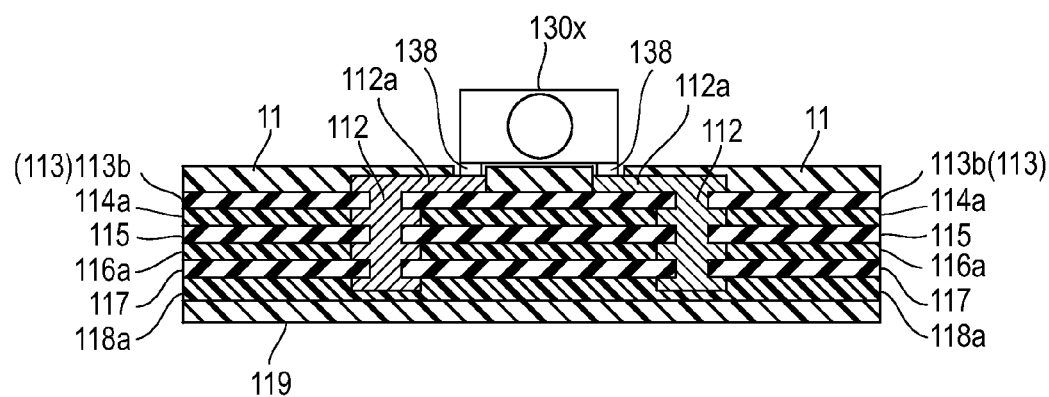
FIG. 10 is a cross-sectional view of the printed wiring board 81$x$ taken along the line B1-B1 in FIG. 8.

Next, the printed wiring boards 81x and 81y according to this embodiment will be described with reference to FIGS. 8 and 9B. The printed wiring boards 81x and 81y have the same structure, and therefore, only the printed wiring board 81x will be described below. The printed wiring board 81y also have the effects and advantages of the printed wiring board 81x described below.

The printed wiring board 81x comprises a first resist layer 11, a first-layer pattern 112a, through-holes 112, a first insulating layer 113b, a second-layer pattern 114, a second-layer insulating material 114a, a second-layer wide pattern 114b, a second insulating layer 115, a third-layer pattern 116, a third-layer insulating material 116a, a third insulating layer 117, a fourth-layer pattern 118, a fourth-layer insulating material 118a, and a second resist layer 119. In the following, the surface of the printed wiring board 81x on which the light-receiving devices 130x are mounted will be described as the upper surface, and the surface of the second resist layer 119 of the printed wiring board 81x will be described as the lower surface. However, these descriptions are not intended to limit the orientation of the printed wiring board 81x during use.

From the view points of electrical conductivity and cost, the first-layer pattern 112a, the second-layer pattern 114, the second-layer wide pattern 114b, the third-layer pattern 116 and the fourth-layer pattern 118 are made of copper, for example. The first resist layer 11 and the second resist layer 119 are made of thermosetting epoxy resin, for example. The first insulating layer 113, the second insulating layer 115 and the third insulating layer 117 are made of glass epoxy resin, for example. The glass epoxy resin (referred to also as glass cloth epoxy resin) is a stack of glass fiber cloth which is impregnated with epoxy resin and thereafter hardened by heat. Thus, the glass epoxy resin has a rough surface. The thickness of each layer and the shape of each pattern can be appropriately designed.

The fourth-layer pattern 118 is formed on the second resist layer 119, and the third insulating layer 117 is formed on the fourth-layer pattern 118. The spaces defined by the fourth-layer pattern 118 between the second resist layer 119 and the third insulating layer 117 are filled with the fourth-layer insulating material (an adhesive) 118a.

The third-layer pattern 116 is formed on the third insulating layer 117, and the second insulating layer 115 is formed on the third-layer pattern 116. The spaces defined by the third-layer pattern 116 between the third insulating layer 117 and the second insulating layer 115 are filled with the third-layer insulating material (an adhesive) 116a.

The second-layer pattern 114 and the second-layer wide pattern 114b are formed on the second insulating layer 115, and the first insulating layer 113b is formed on the second-layer pattern 114 and the second-layer wide pattern 114b. The spaces defined by the second-layer pattern 114 and the second-layer wide pattern 114b between the second insulating layer 115 and the first insulating layer 113b are filled with the second-layer insulating material (an adhesive) 114a.

The first-layer pattern 112a is formed on the first insulating layer 113b, and the through-holes 112 are formed in the first insulating layer 113b, the second insulating layer 115 and the third insulating layer 117 to vertically penetrate through the layers. The first-layer pattern 112a, the second-layer pattern 114, the third-layer pattern 116 and the fourth-layer pattern 118 are in contact with at least one of the through-holes 112 in the respective layers as required and thereby electrically connected to each other.

Except for a part of the first insulating layer 113b and a part of the first-layer pattern 112a, the first insulating layer 113b, the first-layer pattern 112a and the through-holes 112 are covered with the first resist layer 11. The printed wiring board 81x differs from the conventional printed wiring boards 91x and 91y in the part covered with the first resist layer 11. More specifically, as shown in FIGS. 5 and 8(a), except for (1) a part of the first-layer pattern 112a and (2) a rectangular domain of the first insulating layer 113b that extends for a distance H from the edge of the printed wiring board 81x in front of the light-receiving devices 130x toward the light-receiving devices 130x, the entire upper surface of the printed wiring board 81x is covered with the first resist layer 11. In other words, the first insulating layer 113b is exposed in the rectangular domain that extends for a distance H from the edge of the printed wiring board 81x in front of the light-receiving devices 130x toward the light-receiving devices 130x. The distance H will be described later. Each lead 138 of the light-receiving device 130x is soldered to the exposed part of the first-layer pattern 112a of the printed wiring board 81x (see FIG. 10).

Typically, the first-layer pattern 112a is formed by etching a metal layer (a copper foil, for example) formed over the entire upper surface of the first insulating layer 113b, and therefore, the first insulating layer 113b has a certain surface roughness. Depending on the etching technique and the materials of the metal layer and the first insulating layer 113b, the surface roughness of the first insulating layer 113b is enough to cause diffuse reflection of infrared light. Furthermore, if the first insulating layer 113b is made of glass epoxy resin, the first insulating layer 113b itself has a certain surface roughness. Thus, the exposed rectangular domain has an extremely low reflectance and causes diffuse reflection of infrared light. Therefore, depending on the reflection path, the incident ambient light 21 is reflected diffusely by the rectangular domain, so that the ambient light 21 does not reach the light-receiving devices 130x, or the intensity of any ambient light 21 reaching the light-receiving devices 130x is sufficiently low. As a result, the possibility of malfunction of the optical touch panel 100 caused by the ambient light is sufficiently reduced.

According to this embodiment, the light-emitting devices 103x and 103y emit infrared light. However, the present invention is not limited to the infrared light. Considering the fact that malfunction of the optical touch panel can be caused by the ambient light 21 including the same kind of light as the light emitted by the light-emitting devices 103x and 103y, the rectangular domain has only to have a surface roughness enough to cause diffuse reflection of the same kind of light as the light emitted by the light-emitting devices 103x and 103y. The first insulating layer 113b (the surface layer of the printed wiring board 81x) having such a surface roughness would typically be fabricated by etching the metal layer and the first insulating layer 113b selected by considering the wavelength of the light emitted by the light-emitting devices 103x and 103y or the like. Etching is also advantageous from the viewpoint of cost. Of course, the present invention is not limited to etching, and the exposed part of the first insulating layer 113b can be further subjected to surface blasting as required.

Figure 11:
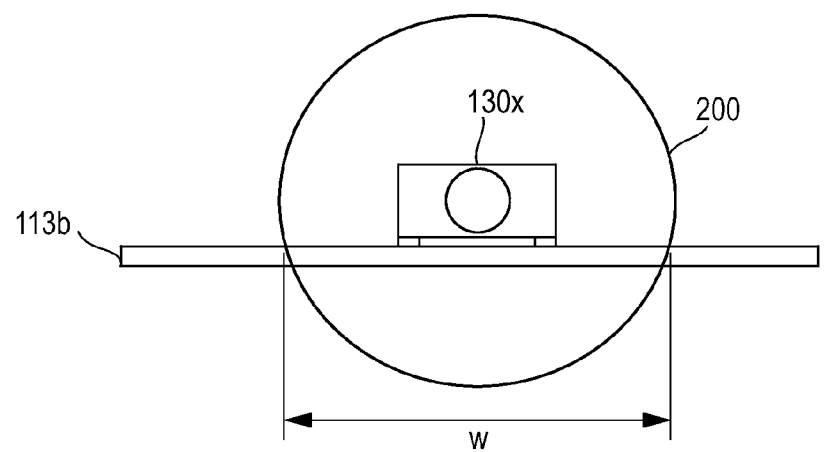
FIG. 11 is a diagram showing a directivity range of the light-receiving device.
Figure 12:
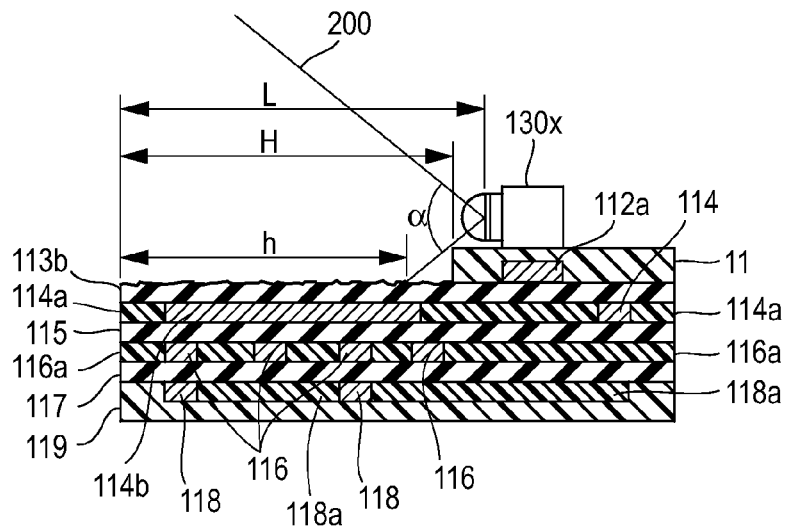
FIG. 12 is a diagram showing the directivity range of the light-receiving device (in the vertical direction)
Figure 13A:
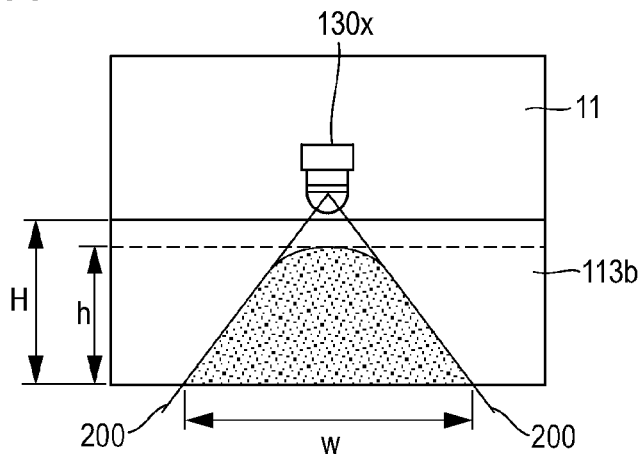
FIG. 13A is a diagram for illustrating a directivity surface domain of one light-receiving device.
Figure 13B:
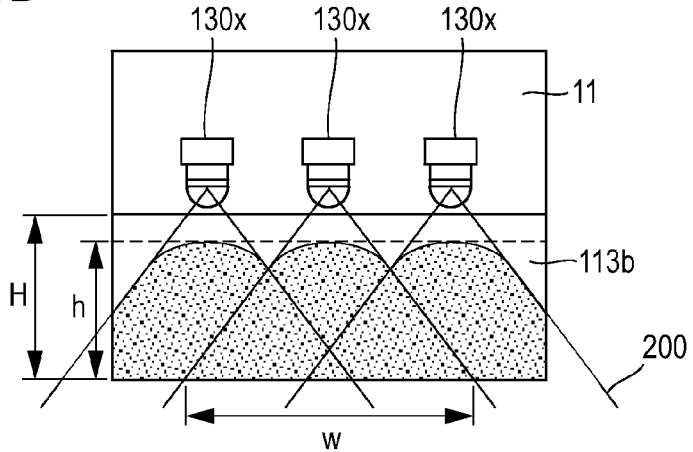
FIG. 13B is a diagram showing directivity surface domains of three light-receiving devices overlapping with each other.

The rectangular domain will be further described. FIG. 11 is a front view of one light-receiving device 130x, when looking straight the light-receiving surface of one light-receiving device 130x, showing a directivity range 200 of the light-receiving device 130x at the edge of the printed wiring board 81x in front of the light-receiving device 130x. FIG. 12 shows the directivity range 200 in the vertical direction. FIG. 13A shows a surface domain of the printed wiring board 81x included in the directivity range 200 (referred to also as a directivity surface domain hereinafter). FIG. 13B shows the directivity surface domains of three light-receiving devices 130x arranged in a row on the printed wiring board 81x that overlap with each other. The "directivity range of the light-receiving device" means the "effectually sensitive scope of the light-receiving device". Note that the directivity of the light-receiving device 130x depends on the shape of the lens of the light-receiving device 130x or the like, and therefore, the directivity range shown in these drawings is only an example of the directivity range.

To facilitate understanding of the present invention, the directivity surface domain for one light-receiving device 130x will be described. As shown in FIG. 12, the distance h for which light reflected by the printed wiring board 81x can travel toward the light-receiving device 130x in front of the light-receiving device 130x depends on the maximum central angle α of the directivity range 200 in the vertical direction. As shown in FIG. 13A, a domain on the surface of the first insulating layer 113b defined by the directivity range 200 (the domain indicated by a sandy pattern in FIG. 13A) is the directivity surface domain of the light-receiving device 130x. The width of the directivity surface domain along the edge of the printed wiring board 81x in front of the light-receiving device 130x is denoted by reference character w (see FIGS. 11 and 13A). If the surface in the directivity surface domain has the surface roughness described above, the effect of the ambient light 21 on the light-receiving device 130x associated with the directivity surface domain is sufficiently reduced.

According to this embodiment, the domain having the surface roughness described above is the "rectangular domain that extends for a distance H from the edge of the printed wiring board 81x in front of the light-receiving devices 130x toward the light-receiving devices 130x". However, this is primarily for reasons of the cost of fabricating the printed wiring board 81x. As is apparent from the above description of the directivity surface domain and FIGS. 11 to 13, the minimum domain of the first insulating layer 113b that has to have the surface roughness described above corresponds to a domain on the surface of the first insulating layer 113b included in the whole of the directivity ranges of the light-receiving devices 130x. In other words, the minimum domain of the first insulating layer 113b that has to have the surface roughness described above corresponds to the whole of the directivity surface domains of the light-receiving devices 130x. In the example shown in FIG. 13B, the minimum domain is the whole of the three directivity surface domains overlapping with each other (the domain indicated by the sandy pattern in FIG. 13B). In practice, however, it is costly to precisely form such a minimum domain by etching. In addition, although the light-receiving devices 130x and 130y are typically all of the same type, it would be necessary to consider variations in the directivity range among the light-receiving devices. In view of such circumstances, a domain shaped and sized to include the minimum domain is preferably etched, in order to save cost and prevent malfunction. For this reason, the domain having the surface roughness described above according to this embodiment is the "rectangular domain that extends for a distance H from the edge of the printed wiring board 81x in front of the light-receiving devices 130x toward the light-receiving devices 130x". Of course, h is equal to or smaller than H (h≦H). In this example, it is sufficient for the distance H that the upper limit of the distance H is equal to a horizontal distance L from the edge of the printed wiring board 81x to the light-receiving surfaces of the light-receiving devices 130x, or in other words, the distance H is equal to or smaller than the distance L (H≦L) (see FIG. 13).

Next, the second-layer wide pattern (a light absorption layer) 114b will be described. The second-layer wide pattern 114b is preferably positioned to overlap with the minimum domain or the rectangular domain when the printed wiring board 81x is viewed from the front thereof (from above the surface to which the light-receiving devices 130x are fixed). Although the overlap ratio is most preferably 100%, the second-layer wide pattern 114b preferably has an area enough to overlap with at least the minimum domain. Providing the optical touch panel 100 with the second-layer wide pattern 114b has the following advantages (1) to (4).

(1) Typically, the surface of the pattern of the printed wiring board formed by a copper foil, for example, is subjected to an oxidation treatment (such as blackening and browning) in order to enhance the adhesion to the insulating layers. Therefore, the pattern surface turns to a color of the dark color system (a color system of low brightness including black, navy blue, dark green and dark brown) and looks black or dark brown through the first insulating layer 113b. Therefore, the second-layer wide pattern 114b absorbs the ambient light 21 transmitted through the first insulating layer 113b, which is the surface layer of the printed wiring board 81x, and reflection of the ambient light 21 by the second-layer wide pattern 114b is reduced. Although the light-emitting devices 103x and 103y according to this embodiment emit infrared light, the light used in the present invention is not limited to infrared light. As can be seen from the above description, it is sufficient that a light absorption layer having a color that absorbs the same kind of light as the light emitted by the light-emitting devices 103x and 103y is formed at the part where the second-layer wide pattern 114b is formed.

(2) Since the second-layer wide pattern 114b has a relatively wide area as described above, the second-layer wide pattern 114b can block the light from the LCD 25 and prevent the light from the LCD 25 from reaching the light-receiving devices 130x.

(3) Since the second-layer wide pattern 114b is a metal layer having a relatively wide area as described above, the second-layer wide pattern 114b enhances the rigidity of the printed wiring board 81x. Therefore, the printed wiring board 81x has an enhanced durability against warpage and distortion. As a result, the light-receiving devices 130x fixed to the printed wiring board 81x are less likely to be optically misaligned.

(4) Since the second-layer wide pattern 114b is a metal layer, the second-layer wide pattern 114b can block radiation noise from an electronic component of the LCD 25. That is, the second-layer wide pattern 114b can reduce the effect of the radiation noise on the light-receiving devices 130x.

Although the second-layer wide pattern 114b provided in the second layer has a high reflection reducing effect, the place where such a wide pattern is provided is not limited to the second layer. A wide pattern similar to the second-layer wide pattern 114b provided in a layer below the second layer can be expected to have an effect of reducing reflection of the ambient light 21 transmitted through the insulating layers made of epoxy resin.

Note that the presence of the second-layer wide pattern 114b is not essential from the viewpoint of the surface roughness of the first insulating layer 113b.

<Comparison>

Figure 14A:
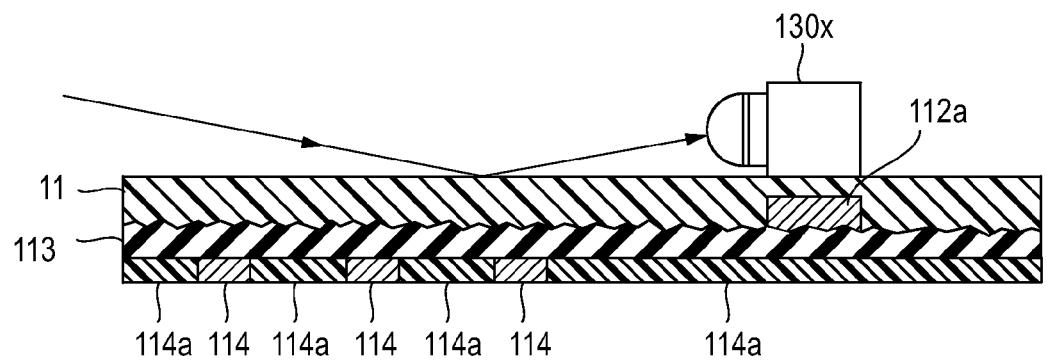
FIG. 14A is a diagram showing reflection of ambient light 21 from a first resist layer 11 of the conventional printed wiring board 91$x$.
Figure 14B:
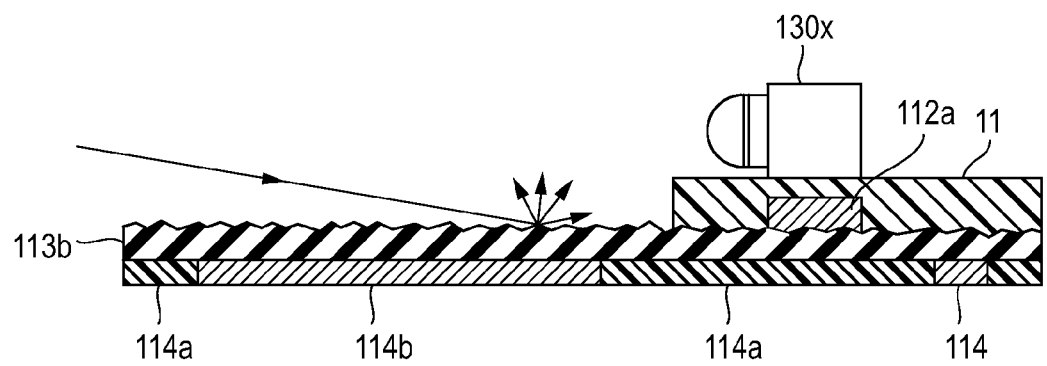
FIG. 14B is a diagram showing diffuse reflection of ambient light 21 from a first insulating layer 113$b$ of the printed wiring board 81$x$.

The surface of the first resist layer 11 is typically smooth and glossy and therefore has an extremely high reflectance for the ambient light 21. For the conventional printed wiring boards 91x and 91y, as shown in FIG. 14A, the ambient light 21 is reflected by the surface of the first resist layer 11 and reaches the light-receiving device 130x, 130y. On the other hand, the first insulating layer 113b having a rough surface exposed has a sufficiently low reflectance for the ambient light 21. Therefore, for the printed wiring board 81x and 81y, as shown in FIG. 14B, the ambient light 21 is reflected diffusely by the exposed rough surface, so that the ambient light 21 does not reach the light-receiving devices 130x, or the intensity of any ambient light 21 reaching the light-receiving devices 130x is sufficiently low. Note that illustration of some layers is omitted in FIGS. 14A and 14B.

<Demonstration>

Table 2 shows a result of measurement of the reflectance for visible light of the conventional printed wiring boards 91x and 91y and the printed wiring boards 81x and 81y used in the optical touch panel 100 according to the present invention. The reflectance is a relative value on the assumption that the reflectance of a mirror is 100%. As can be seen from Table 2, the reflectance of the printed wiring boards 81x and 81y according to this embodiment described above is about 2.5% of the reflectance of the conventional printed wiring boards 91x and 91y.

TABLE 2

|  | incident angle: 20° | incident angle: 60° |
|---|---|---|
| printed wiring boards 91x and 91y | 0.41% | 5.05% |
| printed wiring boards 81x and 81y | 0.01% | 0.14% |
| mirror | 100% | 100% |

<Modification>

Figure 15:
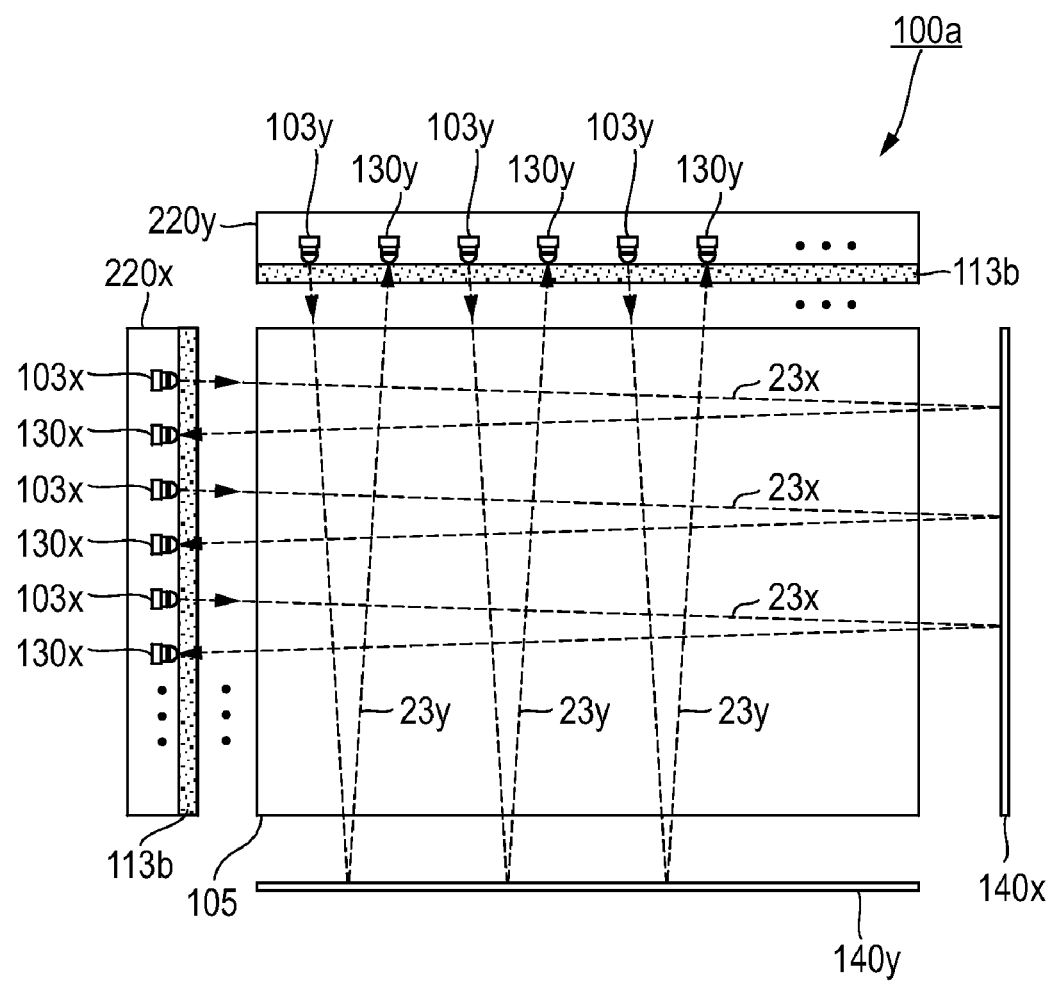
FIG. 15 is a plan view of an optical touch panel 100$a$.

In the optical touch panel 100 described above, the light-emitting devices 103x and the light-receiving devices 130x are paired with each other and disposed opposite to each other, and the light-emitting devices 103y and the light-receiving devices 130y are paired with each other and disposed opposite to each other. However, the essence of the present invention lies in the structure of the printed wiring boards 81x and 81y, and therefore, the optical touch panel according to the present invention is not limited to the structure of the optical touch panel 100 shown in FIGS. 5 and 6. For example, FIG. 15 shows an optical touch panel 100a as a modification of the optical touch panel 100.

In the optical touch panel 100a, a plurality of light-emitting devices 103x and a plurality of light-receiving devices 130x are alternately arranged in a row along one of a pair of opposite sides of a transparent plate 105 with the light-emitting surface of each light-emitting device 103x and the light-receiving surface of each light-receiving device 130x facing to the transparent plate 105, and a reflection plate 140x having a mirror surface is disposed along the other of the pair of opposite sides of the transparent plate 105. The plurality of light-emitting devices 103x and the plurality of light-receiving devices 130x are fixed to a printed wiring board 220x. Each light path 23x between the light-emitting device 103x and the light-receiving device 130x paired with each other involves reflection by the reflection plate 140x.

Similarly, in the optical touch panel 100a, a plurality of light-emitting devices 103y and a plurality of light-receiving devices 130y are alternately arranged in a row along one of the other pair of opposite sides of the transparent plate 105 with the light-emitting surface of each light-emitting device 103y and the light-receiving surface of each light-receiving device 130y facing to the transparent plate 105, and a reflection plate 140y having a mirror surface is disposed along the other of the pair of opposite sides of the transparent plate 105. The plurality of light-emitting devices 103y and the plurality of light-receiving devices 130y are fixed to a printed wiring board 220y. Each light path 23y between the light-emitting device 103y and the light-receiving device 130y paired with each other involves reflection by the reflection plate 140y.

As with the printed wiring boards 81x and 81y described above, the printed wiring boards 220x and 220y have a first insulating layer 113b whose surface has the minimum domain or rectangular domain having the surface roughness described above, and therefore, the optical touch panel 100a has the same advantages as the optical touch panel 100. In the optical touch panel 100a shown in FIG. 15, the surface of the first insulating layer 113b in front of the light-emitting devices 103x and 103y also has the surface roughness described above. However, the present invention is not limited to such a structure, and it is sufficient that a region which includes the directivity surface domains of the light-receiving devices 130x and 130y has the surface roughness described above.

Figure 16:
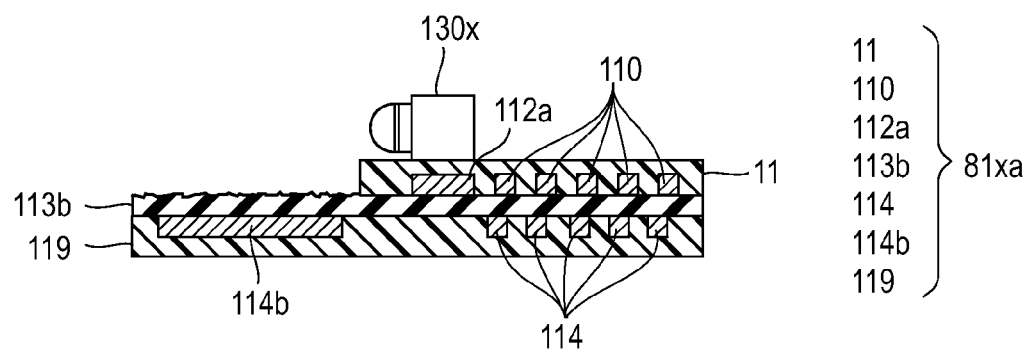
FIG. 16 is a cross-sectional view of a printed wiring board 81$xa$, which is a modification of the printed wiring board 81$x$.

Furthermore, although the printed wiring boards 81x and 81y have a four-layer structure in the embodiment described above, the number of layers can be appropriately determined depending on the design conditions. For example, as shown in FIG. 16, a printed wiring board 81xa in which a first insulating layer 113b is disposed between a first resist layer 11 and a second resist layer 119 is possible. A second-layer pattern 114 and a second-layer wide pattern 114b are formed under the first insulating layer 113b, and the first insulating layer 113b, the second-layer pattern 114 and the second-layer wide pattern 114b are covered with the second resist layer 119. First-layer patterns 112a and 110 are formed on the first insulating layer 113b. Except for a part of the first insulating layer 113b and a part of the first-layer pattern 112a, the first insulating layer 113b and the first-layer patterns 112a and 110 are covered with the first resist layer 11. The part of the first insulating layer 113b that is not covered with the first resist layer 11 is the same as that in the embodiment described above.

Figure 17:
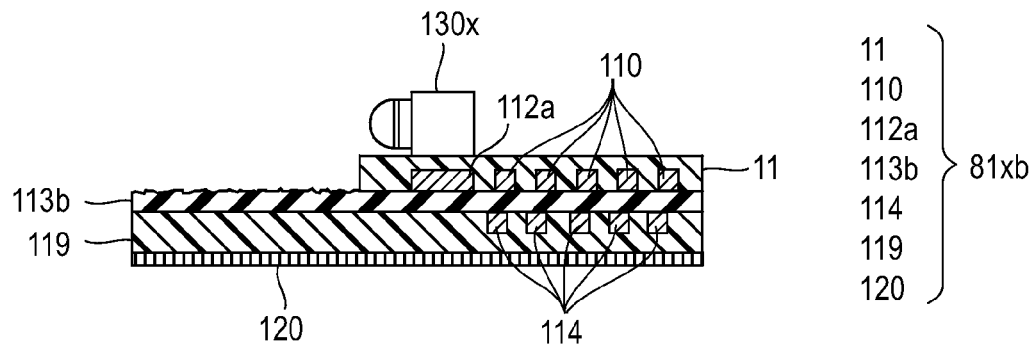
FIG. 17 is a cross-sectional view of a printed wiring board 81$xb$, which is a modification of the printed wiring board 81$x$.

Furthermore, although the printed wiring boards 81x and 81y have the second-layer wide pattern 114b in the embodiment described above, the present invention is not limited to this embodiment. As shown in FIG. 17, a printed wiring board 81xb that does not have the second-layer wide pattern 114b but has a serigraph layer 120 that covers a second resist layer 119 can also be provided. The serigraph layer 120 is formed by serigraph with an ink of black or other color. The region of the serigraph layer 120 preferably overlaps with the region of the second-layer wide pattern 114b that would otherwise be formed when the printed wiring board 81x is viewed from the front thereof (from above the surface to which the light-receiving devices 130x are fixed). With such a configuration, as in the case where the second-layer wide pattern 114b is formed, (1) in a case where the ambient light 21 is transmitted through the printed wiring board 81xb (such as a case where the first insulating layer 113b and the second resist layer 119 are made of epoxy resin), reflection of the ambient light 21 transmitted through the first insulating layer 113b of the printed wiring board 81xb can be reduced, and (2) light from the LCD 25 can be prevented from reaching the light-receiving devices 130x and 130y. In addition, the entire surface of the second layer (the back surface of the first insulating layer 113b) can be used for formation of the wiring pattern.

The foregoing description of the embodiments of the invention has been presented for the purpose of illustration and description. It is not intended to be exhaustive or to limit the invention to the precise form disclosed. Modifications or variations are possible in light of the above teachings. The embodiments was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An optical touch panel, comprising:
a transparent plate;
a plurality of light-emitting devices and a plurality of light-receiving devices arranged in the vicinity of the transparent plate; and
a substrate to which at least one of the plurality of light-receiving devices is fixed,
wherein a plurality of light paths are formed in front of the transparent plate, each light path being formed by a pair of one of the plurality of light-emitting devices and a corresponding one of the plurality of light-receiving devices,
the substrate has a surface layer that has a surface roughness which causes diffuse reflection of the same kind of light as light emitted by each of the plurality of light-emitting devices, and
a region, referred to as a diffuse-reflection region hereinafter, having the surface roughness on a surface of the surface layer includes at least a region on the surface of the surface layer included in a directivity range of said at least one of the plurality of light-receiving devices fixed to the substrate.

2. The optical touch panel according to claim 1, wherein the surface layer is an insulating layer of the substrate, and
the surface roughness is provided by etching a metal layer of the substrate to expose the insulating layer.

3. The optical touch panel according to claim 1, wherein the surface layer is a glass epoxy resin layer of the substrate.

4. The optical touch panel according to claim 1, wherein the substrate has a layer different from the surface layer, the layer being referred to as a light absorption layer hereinafter,
   the light absorption layer is disposed to overlap with the diffuse-reflection region when the substrate is viewed from the front thereof, and
   the light absorption layer has a color that absorbs the same kind of light as the light emitted by each of the plurality of light-emitting devices.

5. The optical touch panel according to claim 4, wherein the surface layer has an optical transparency, and
   the light absorption layer is disposed in contact with a surface of the surface layer opposite to the surface of the surface layer.

6. The optical touch panel according to claim 4, wherein the light absorption layer is a serigraph layer,
   the light absorption layer is provided in the substrate as a layer opposite to the surface layer of the substrate, and
   the substrate excluding the optical absorption layer has an optical transparency.

7. The optical touch panel according to claim 2, wherein the substrate has a layer different from the surface layer, the layer being referred to as a light absorption layer hereinafter,
   the light absorption layer is disposed to overlap with the diffuse-reflection region when the substrate is viewed from the front thereof, and
   the light absorption layer has a color that absorbs the same kind of light as the light emitted by each of the plurality of light-emitting devices.

8. The optical touch panel according to claim 7, wherein the surface layer has an optical transparency, and
   the light absorption layer is disposed in contact with a surface of the surface layer opposite to the surface of the surface layer.

9. The optical touch panel according to claim 7, wherein the light absorption layer is a serigraph layer,
   the light absorption layer is provided in the substrate as a layer opposite to the surface layer of the substrate, and
   the substrate excluding the optical absorption layer has an optical transparency.

10. The optical touch panel according to claim 3, wherein the substrate has a layer different from the surface layer, the layer being referred to as a light absorption layer hereinafter,
    the light absorption layer is disposed to overlap with the diffuse-reflection region when the substrate is viewed from the front thereof, and
    the light absorption layer has a color that absorbs the same kind of light as the light emitted by each of the plurality of light-emitting devices.

11. The optical touch panel according to claim 10, wherein the surface layer has an optical transparency, and
    the light absorption layer is disposed in contact with a surface of the surface layer opposite to the surface of the surface layer.

12. The optical touch panel according to claim 10, wherein the light absorption layer is a serigraph layer,
    the light absorption layer is provided in the substrate as a layer opposite to the surface layer of the substrate, and
    the substrate excluding the optical absorption layer has an optical transparency.

* * * * *